(12) United States Patent
Rowley et al.

(10) Patent No.: US 7,850,898 B1
(45) Date of Patent: Dec. 14, 2010

(54) METHOD FOR MAKING A RESERVOIR

(75) Inventors: William W. Rowley, Chagrin Falls, OH (US); Grandin A. Rushlander, Mantua, OH (US)

(73) Assignee: Mercury Plastics, Inc., Middlefield, OH (US)

( * ) Notice: Subject to any disclaimer, the term of this patent is extended or adjusted under 35 U.S.C. 154(b) by 397 days.

(21) Appl. No.: 11/682,477

(22) Filed: Mar. 6, 2007

(51) Int. Cl.
*B29C 49/04* (2006.01)

(52) U.S. Cl. .................. 264/514; 264/516; 264/524; 264/552; 264/573; 264/456; 264/459

(58) Field of Classification Search ............. None
See application file for complete search history.

(56) References Cited

U.S. PATENT DOCUMENTS

| | | |
|---|---|---|
| 1,692,223 A | 10/1926 | Pinkerton et al. |
| 2,477,210 A | 7/1949 | Skinner |
| 2,787,131 A | 4/1957 | Wurtz |
| 2,788,642 A | 4/1957 | Burkhead et al. |
| 3,429,140 A | 2/1969 | White |
| 3,511,415 A | 5/1970 | Crowe |
| 3,834,178 A | 9/1974 | Pink |
| 3,982,406 A | 9/1976 | Hanson et al. |
| 4,213,933 A * | 7/1980 | Cambio .............. 264/515 |
| 4,313,904 A * | 2/1982 | Larkin et al. .......... 264/515 |
| 4,335,746 A | 6/1982 | Miyahara et al. |
| 4,680,071 A * | 7/1987 | Candle ............... 156/218 |
| 4,739,629 A | 4/1988 | True |
| 5,315,845 A | 5/1994 | Lee |
| 5,542,264 A | 8/1996 | Hortin et al. |
| 5,640,994 A | 6/1997 | Jacobsen |
| 6,079,221 A | 6/2000 | Senner |
| 6,627,136 B2 | 9/2003 | Frey, Jr. |
| 6,810,682 B1 | 11/2004 | Schuchart |

OTHER PUBLICATIONS

Repair Clinic.com Water Reservoir Kit, 1999.
Repair Clinic.com In-Refrigerator Water Reservoir With Tube, 1999.
Repair Clinic.com In-Refrigerator Water Supply Reservoir With Tubes and Connection Fittings, 1999.
Repair Clinic.com Water Tank With Tubing, 2005.
Repair Clinic.com Water Reservoir With Tubing and Couplers, 1999.
Repair Clinic.com Water Tank Kit, 1999.

* cited by examiner

*Primary Examiner*—Monica A Huson
(74) *Attorney, Agent, or Firm*—Hahn Loeser & Parks LLP; Jason R. Strobel

(57) ABSTRACT

The invention relates to a process for manufacturing a water reservoir with an inlet and an outlet which are compressively sealingly engaged with the water reservoir tank by utilizing the latent heat of extrusion of the extrudate to bond with the exterior surfaces of the inlet and outlet profiles.

26 Claims, 7 Drawing Sheets

Prior Art

Prior Art
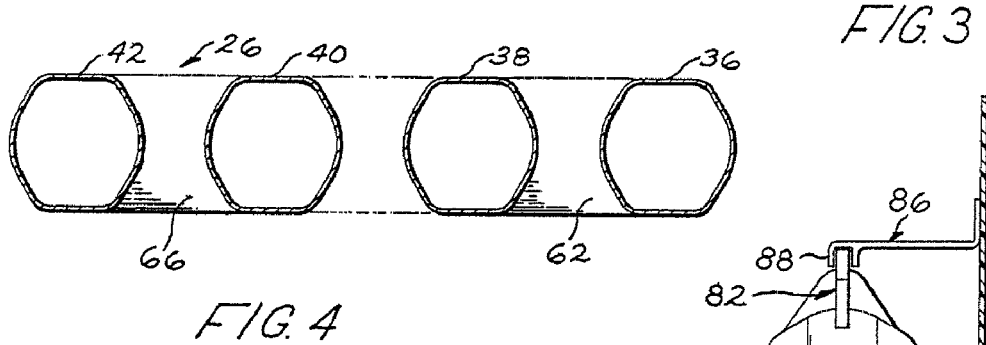
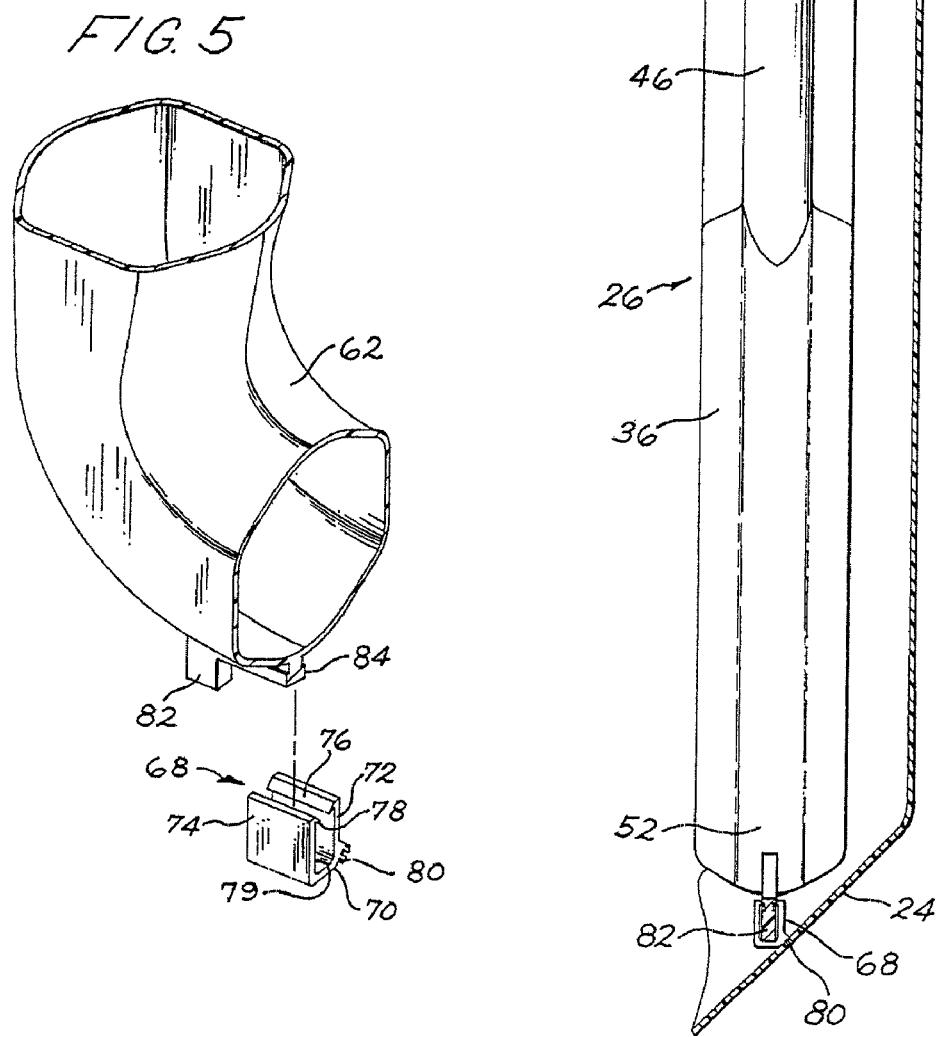

Prior Art

METHOD FOR MAKING A RESERVOIR

TECHNICAL FIELD

This invention relates generally to a process for making a reservoir by using the latent heat of extrusion of an extrudate to sealingly engage ingress and egress tubes, specifically a water reservoir storage tank for use in a refrigerator, primarily to cool water for use in both drinking outlets and ice cube makers. More specifically, the invention relates to a reservoir volume which includes a main body reservoir utilizing an extruded profile into which are added ingress and egress lines utilizing extruded profiles and which are sealingly engaged into the reservoir volume by compression molding using the latent heat present in the reservoir extrudate.

BACKGROUND OF THE INVENTION

It is known to provide dispenser units in the front doors of refrigerators in order to enhance the accessibility to ice and/or water. Typically, such a dispenser unit will be formed in the freezer door of a side-by-side style refrigerator or in the fresh food or freezer door of a top mount style refrigerator. In either case, a water line will be connected to the refrigerator in order to supply the needed water for the operation of the dispenser. For use in dispensing the water, it is common to provide a water tank within the fresh food compartment to act as a reservoir such that a certain quantity of the water can be chilled prior to being dispensed.

Most dispenser equipped refrigerators available on the market today incorporate blow molded water tanks which are arranged vertically in lower sections of the fresh food compartments. More specifically, such a water tank is typically positioned behind a crisper bin or a meat keeper pan within a bottom section of the fresh food compartment so as to be subjected to the cooling air circulating within the compartment. Of course, locating the water tank in the bottom section of the fresh food compartment reduces the permissible size of the crisper bin and/or meat keeper. In addition, since the tank is not an aesthetically appealing feature of the refrigerator, it is generally hidden from view by a sight enhancing cover.

There are at least two commonly employed methods for attaching ingress and egress tubes to the water reservoir. One approach involves the injection molding of threaded flights of screws for use with a correspondingly threaded nut and ferrule or O-ring combination. This approach is illustrated in U.S. Pat. Nos. 3,511,415 (to Crowe); or 3,982,406 (to Hanson et al.). Another approach involves friction fitting of an elastic plastic tube over an injection molded inlet and/or outlet, with optional molded ribs. This approach is illustrated in U.S. Pat. Nos. 4,739,629 (to True); 5,315,845 (to Lee); or 6,079,221 (to Senner). In order to minimize leaks with this type of connection, adjustable hose clamps are often used in conjunction with the friction fit of the elastic plastic hose.

Based on the above, there exists a need in the art for an improved method of manufacturing the water reservoir which minimizes the potential for leakage and which additionally minimizes the amount of manual intervention required to fasten the ingress (inlet) and egress (outlet) profiles of the water reservoir.

SUMMARY OF THE INVENTION

Accordingly it is an object of the invention to provide an attachment method in the manufacture of a water reservoir which creates a material-to-material bond at the ingress and egress attachment areas of the water reservoir.

It is another object of the invention to provide a method of fabricating a serpentine-shaped water reservoir which employs compression molding to create a material-to-material bond at the ingress (inlet) and egress (outlet) attachment areas of the water reservoir.

It is still another object of the invention to provide a method of fabricating a serpentine-shaped water reservoir which employs compression molding in combination with extruded profiles to which air-core molding technology is applied to create a material-to-material bond at the ingress and egress attachment areas of the water reservoir.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE FIGURES

The invention may take physical form in certain parts and arrangements of parts, a preferred embodiment of which will be described in detail in the specification and illustrated in the accompanying drawings which form a part hereof, and wherein:

FIG. 3 is an enlarged view taken along lines 3-3 of Prior Art FIG. 2;

FIG. 4 is a cross-sectional view taken along lines 4-4 of Prior Art FIG. 2;

FIG. 5 is an enlarged perspective view of a portion of the Prior Art water storage tank;

DETAILED DESCRIPTION OF THE INVENTION

The invention is described with reference to the accompanying figures, which illustrate the best mode known to the inventor at the time of the filing of the application illustrating the method of forming the reservoir, preferably for transporting liquids although not limited to such, with connecting ingress and egress profiles of the invention.

Figure 1:
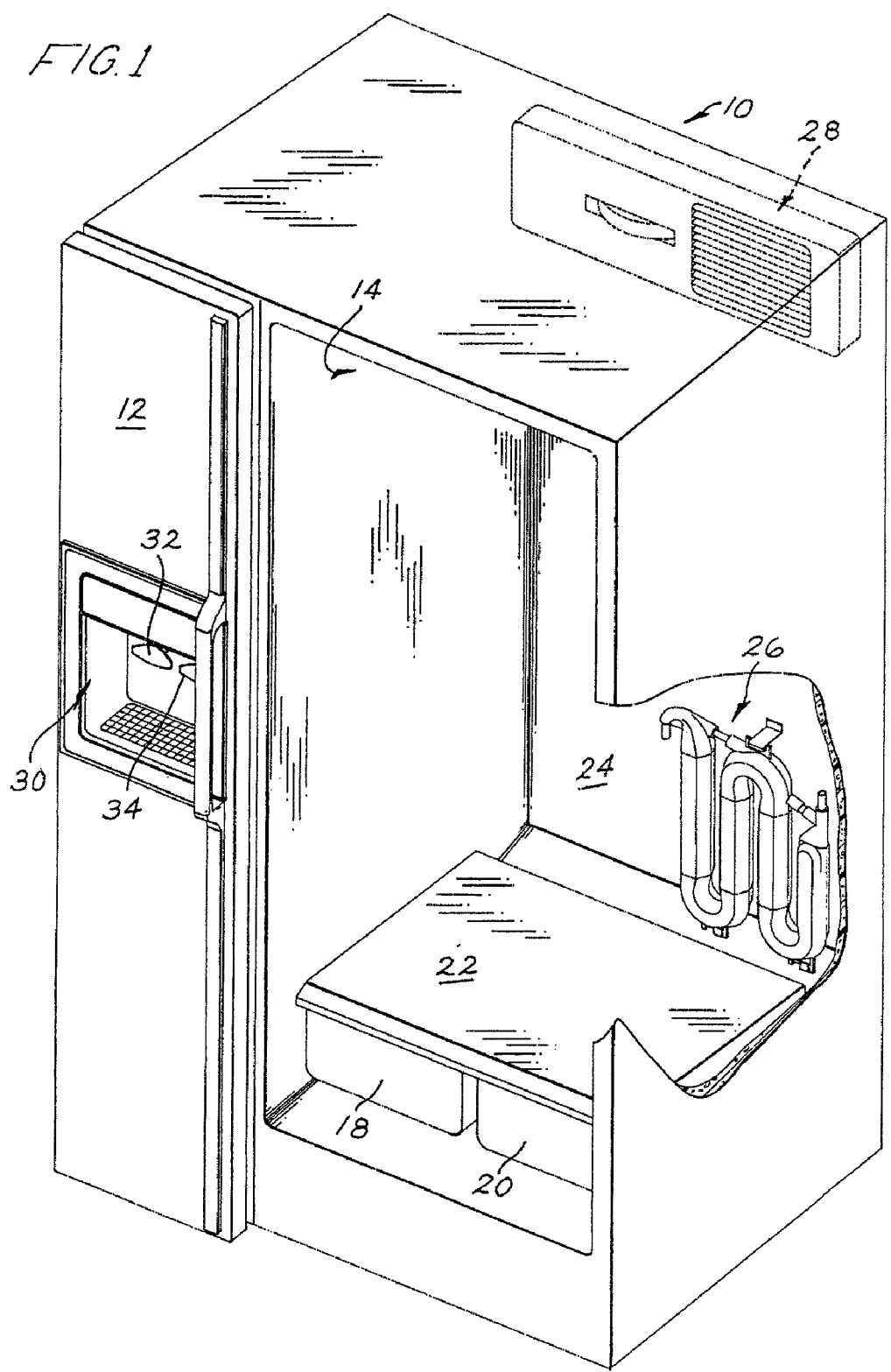
FIG. 1 is a perspective view of a side-by-side refrigerator with parts broken away showing a Prior Art reservoir volume with injection molded connections for ingress and egress tubes.
Figure 2:
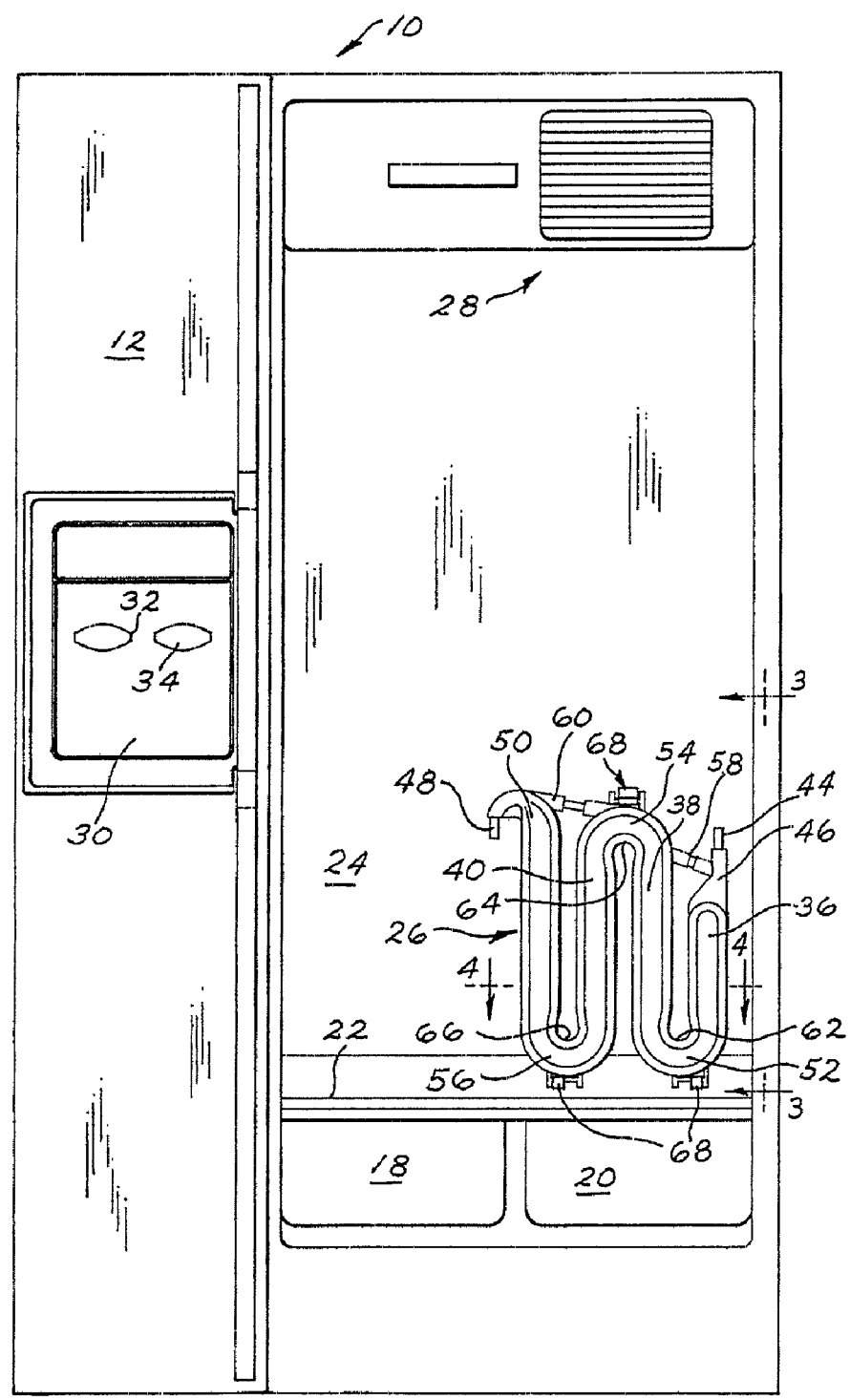
FIG. 2 is a side elevational view of a side-by-side refrigerator with the fresh food compartment door removed to show the Prior Art invention.

With reference to Prior Art FIG. 1 and FIG. 2, there is shown a refrigerator 10 of the side-by-side type wherein there is a freezer compartment on the left hand side closed by a freezer door 12 and a fresh food compartment 14 shown in the figures with the fresh food access door and shelves removed. At the bottom of the fresh food compartment 14 is a meat/vegetable pan assembly including two side-by-side pans 18 and 20 which are covered by a cover 22. Usually there is another vegetable pan above the assembly 16 that extends the width of the fresh food compartment that would be located in front of the water storage tank 26 of the present invention which is secured to the rear wall 24 of the compartment. That pan has been omitted in order to see the water storage tank 26.

Located at the top of the fresh food compartment is a cold air control assembly 28 which the user adjusts to regulate the amount of cold air being introduced from the freezer compartment into the fresh food compartment to keep it at the desired temperature.

The household refrigerator shown in the preferred embodiment is of the side-by-side type and has in the outside of the freezer door 12 a dispensing compartment 30 wherein the user may obtain ice cubes or cold water depending upon the selection by pressing one or the other of the actuators 32 or 34. Not shown is a tube connecting the water storage tank 26 to the outlet for dispensing the cold water into a glass held by the user in the dispensing compartment 30.

With particular reference to FIG. 1 and FIG. 2, the water storage tank 26 comprises a serpentine shaped hollow body having a first straight section 36, a second straight section 38, a third straight section 40, and a fourth straight section 42. These sections are essentially parallel to each other as shown in FIG. 2 and the first section 36 has an inlet 44 at the top end 46 and the fourth section 42 has an outlet 48 at the top end 50. The first section 36 is connected to the second section by a U-shaped curved section 52 at the bottom end, the second section 38 and third section 40 are connected at the top by a U-shaped curved section 54, and the third section 40 and fourth section 42 are connected at the bottom by a U-shaped curved section 56. In this Prior Art reservoir configuration, the four straight sections 36, 38, 40 and 42 are connected at the top thereof by air flow passageways and as shown in the figures. The first passageway extends from the top 46 of the straight section 36 to the top U-shaped curved section 54 and is designated as passageway 58. Between the top U-shaped curved portion 54 and the top end 50 of straight section 42 there is air passageway 60. In this particular Prior Art reservoir, these passageways are provided in order to bleed off any air trapped in the water storage tank so that the water in the tank may be dispensed in a desirable fashion. It will be noted that the four straight sections 36, 38, 40 and 42 are only connected by the three U-shaped curved sections 52, 54 and 56 and the air flow passageways 58 and 60.

Figure 6:
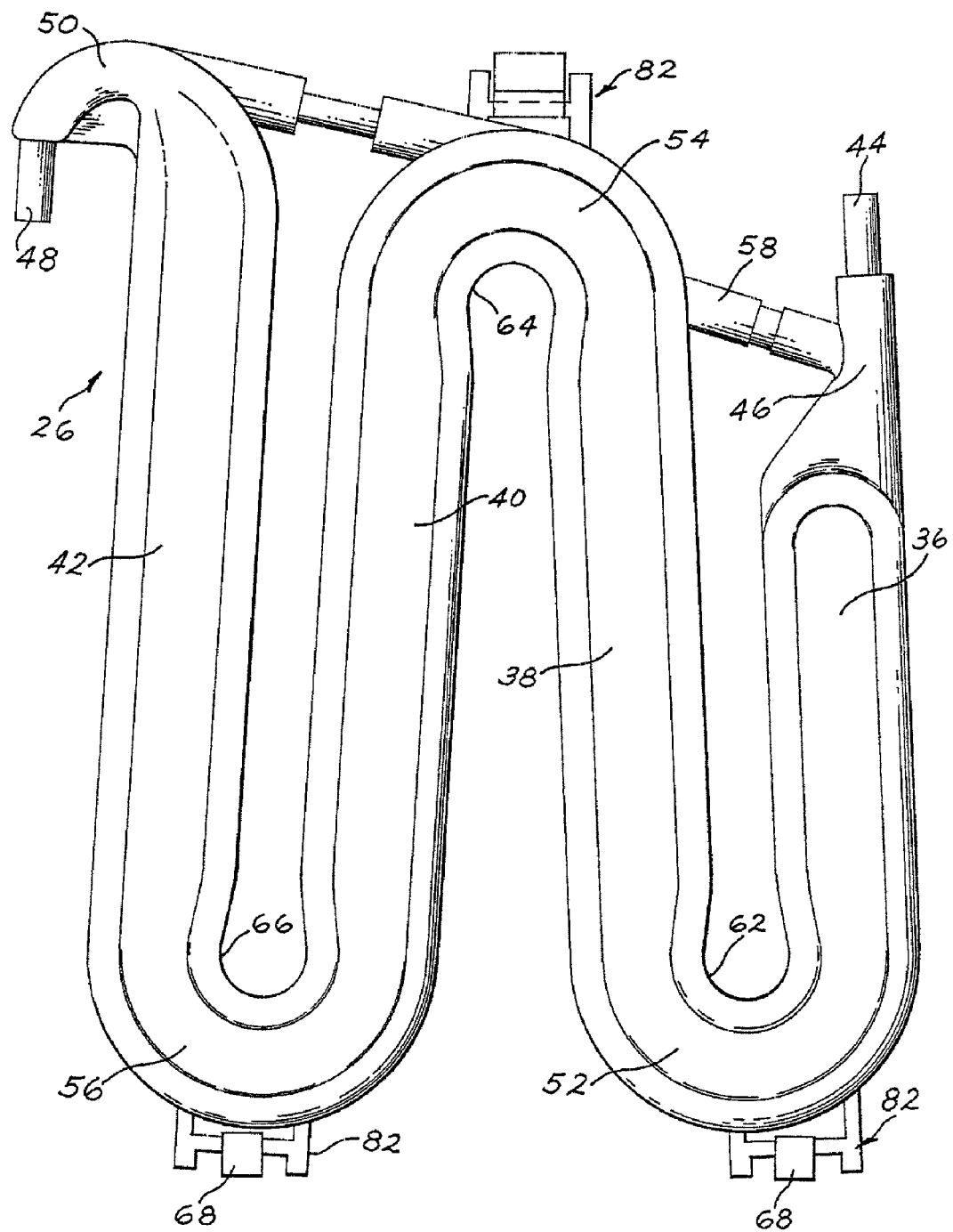
FIG. 6 is a side elevational view of the Prior Art water storage tank showing the configuration of the tank in the event water contained therein is frozen.

The water storage tank 26 is typically molded from polyethylene plastic material and in molding the storage tank the U-shaped curved sections 52, 54 and 56 have the internal curvature area 62, 64 and 66 respectively in the shape of a teardrop which can readily been seen having a wider radius in each of the internal curvature areas 62, 64 and 66 relative to a straight sided reverse curvature. It has been found that with this teardrop shape increased surface area is provided in the curved sections so that in the event water in the tank freezes the material forming the internal curvature areas 62, 64 and 66 will stretch sufficient to prevent rupture of the walls of the water storage tank 26. Moreover, as shown in FIG. 6 the second straight section 38 and the third straight section 40 may separate or diverge from each other in a direction away from the top U-shaped curved section 54 and thus again relieve the force exerted on the water tank by the frozen water contained therein.

As shown particularly in Prior Art FIG. 4 and FIG. 5, the lateral cross-sections of the straight sections 36, 38, 40 and 42 may be polygon in shape. When the profile is hexagonal in cross-section, there is provided a plurality of relatively straight sides so that when the water in the tank 26 freezes the relatively straight sides will bow outwardly and approach a circle configuration as viewed in lateral cross-section, again relieving the internal stress caused by the frozen water to prevent rupture of the water storage tank.

The water storage tank 26 in generally secured to the rear wall 24 of the fresh food compartment 14 and for this purpose there is provided storage tank support means 68 which may be in the form of a U-shaped channel having a base 70 and two spaced apart legs 72 and 74 which legs terminate with an inwardly directed flange 76 and 78 respectively. The legs and base form an open ended channel 79 and at the junction of the base 70 and the legs 72 is a projection 80 which as seen in FIG. 3 is inserted in an opening in the back wall 24 to support the storage tank support means 68. The water storage tank 26 has at least one securing member 82 located at the bottom of at least one U-shaped curved section such as section 52, which securing member 82 cooperates with the support means 68 to allow relative movement therebetween and to secure the water storage tank to the fresh food compartment. As illustrated in the Prior Art reservoir, the securing member 82 is molded in the water storage tank and has a T-shaped cross-section member 84 which slides into the channel 79 of the storage tank support means 68. As can be seen, the T-shaped member 84 can move back and forth in the storage tank support means 68 thereby providing relative movement between the T-shaped member 84 and the support means 68.

In the Prior Art water reservoir illustrated, there are two of these assemblies at the bottom of the water storage tank 26, one located at the bottom of the U-shaped curved section 52 and another at the bottom of the U-shaped curved section 56. The top of the water storage tank 26 is also secured to the rear wall 24 of the fresh food compartment by means of a clip 86 having one end fastened by suitable means to the rear wall 24 and the opposite end having a U-shaped portion 88 which receives therein the upper securing member 82 so that the securing member 82 cooperates with the U-shaped section 88 to prevent movement of the water storage tank relative to the rear wall 24. The securing member 82 at the top of the water tank is also molded along with the water tank and is formed in the U-shaped curved section 54. It will be noted that the Prior Art water storage tank 26 may have two sections, one made up of straight sections 36 and 38 and one made up of straight sections 40 and 42. With this structural arrangement the two sections may be physically moved away from each other at the bottom thereof. This spread apart position is shown in FIG. 6. In the event water in the water storage tank 26 freezes, these two sections can spread apart at the bottom to help relieve the internal stresses caused by the frozen water and also help to prevent rupture of the storage tank. This movement of the two sections is permitted because of the relative movement allowed by the cooperative arrangement between the securing member 82 and the storage tank support means 68 at the bottom of the storage tank.

Figure 7:
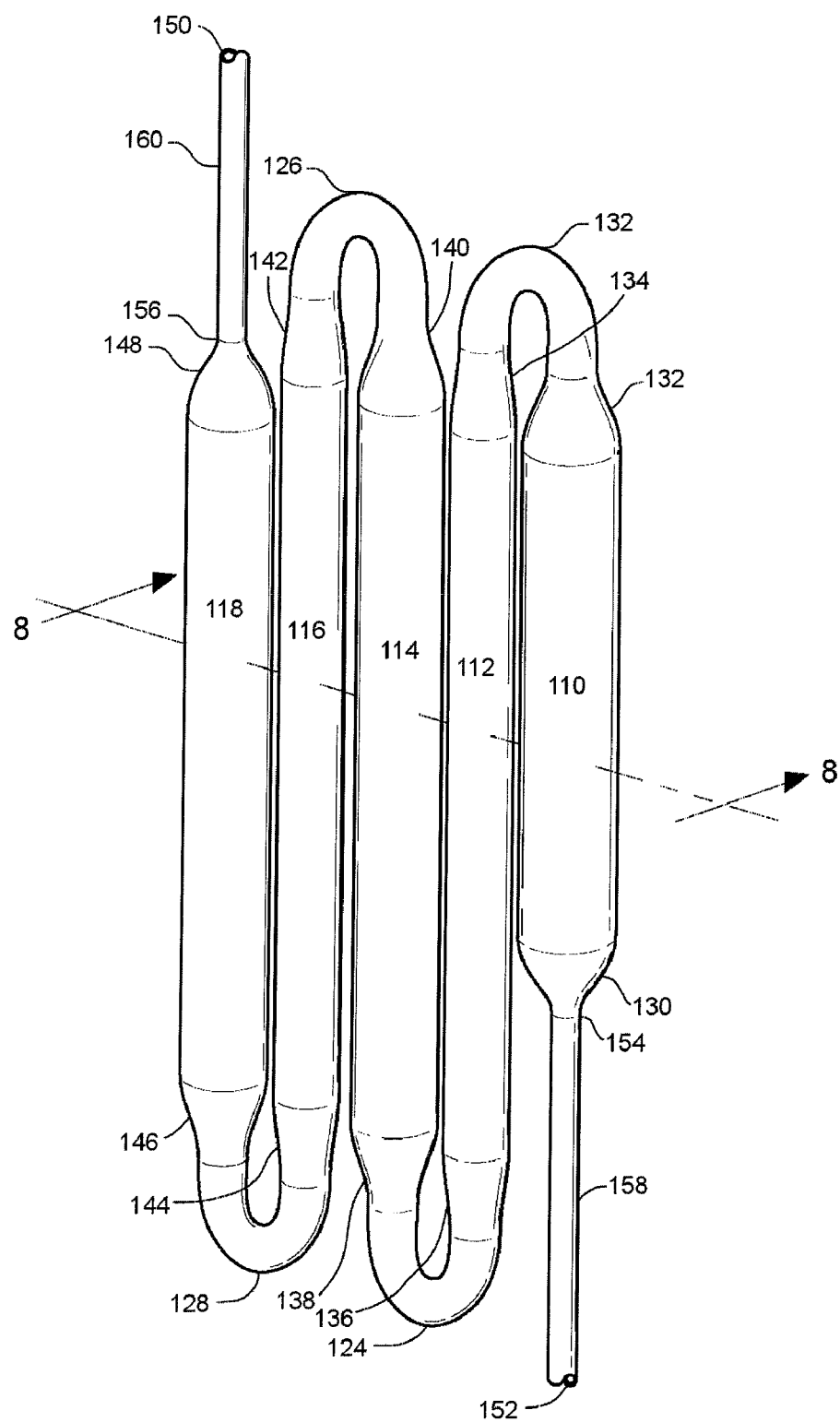
FIG. 7 is a front perspective view of a water reservoir of the invention with ingress and egress tubes molded thereto.
Figure 8:
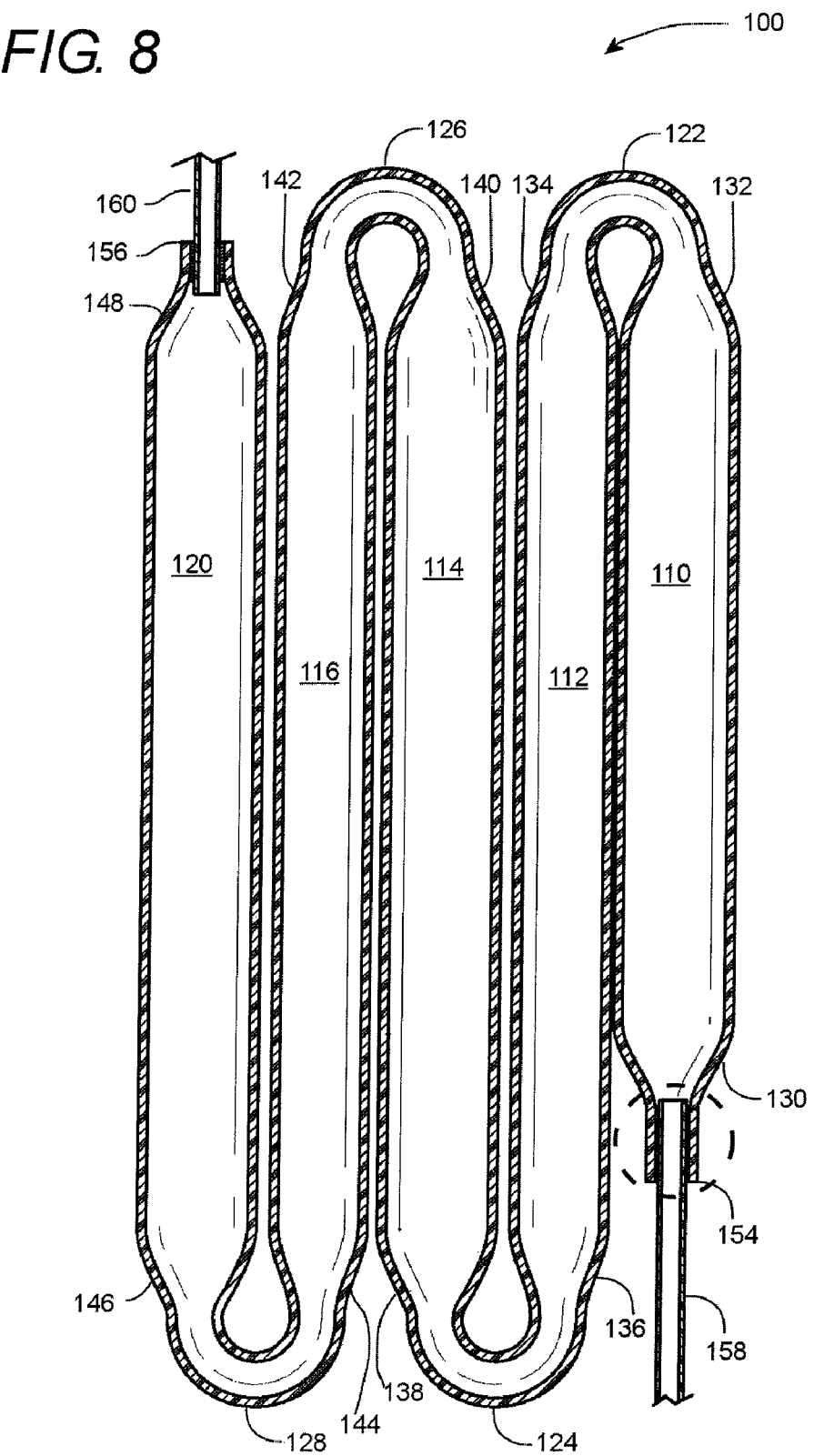
FIG. 8 is a cross-sectional view taken along lines 8-8 of FIG. 7.

FIG. 7 and FIG. 8 illustrate one embodiment of the reservoir 100, preferably a water reservoir of this invention, preferably for use in refrigerator chilled water dispensers as well as ice cube makers. Water reservoir 100 includes a serpentine main body containing a plurality of essentially parallel profile volumes, 110, 112, 114, 116, 118 which are preferably cylindrical in shape, although any polygon shape in cross-section is applicable as evidenced by the polygon-shape of the Prior Art in FIGS. 4-5. While five (5) interconnected volumes are shown in the figure, there is no need to limit the scope of the invention to any particular number, and the number of regions or sections is simply a measure of the capacity of the reservoir. In general, a greater number of interconnected cylindrical volumes is preferred over one large cylindrical volume in that the water cooling rate is slower for larger volumes due to the decreased aqueous surface area which is in direct contact with the chilled walls of the volume, thereby requiring increased time to cool the water to the desired temperature.

The volumes have an expanded middle section and a pair of oppositely necked regions 132, 134, 136, 138, 140, 142, 144 and 146 at each end of the middle section. Each necked region is interconnected to each other by generally U-shaped bends 122, 124, 126 and 128. The first 110 and last 118 volume also have initial 130 and terminal 148 necked regions which initiate and terminate at sealing regions 154 and 156 respectively with inserted ingress 158 and egress 160 profiles, preferably cylindrical tubes.

Figure 8A:
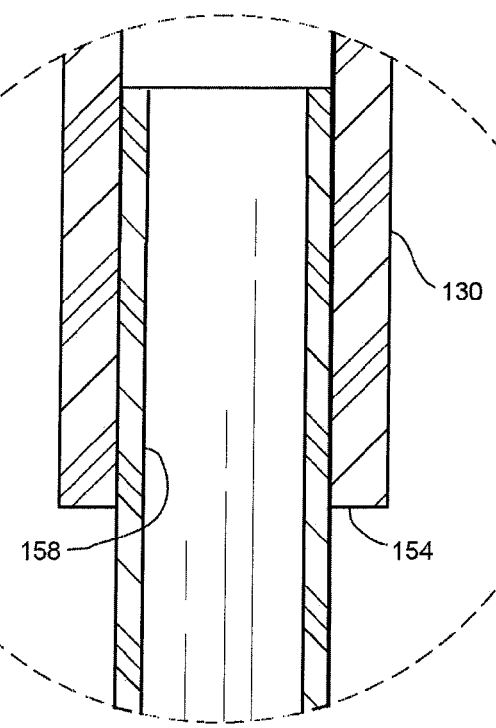
FIG. 8a is an exploded view of one of the molded tube areas of FIG. 8 without insert.
Figure 8B:
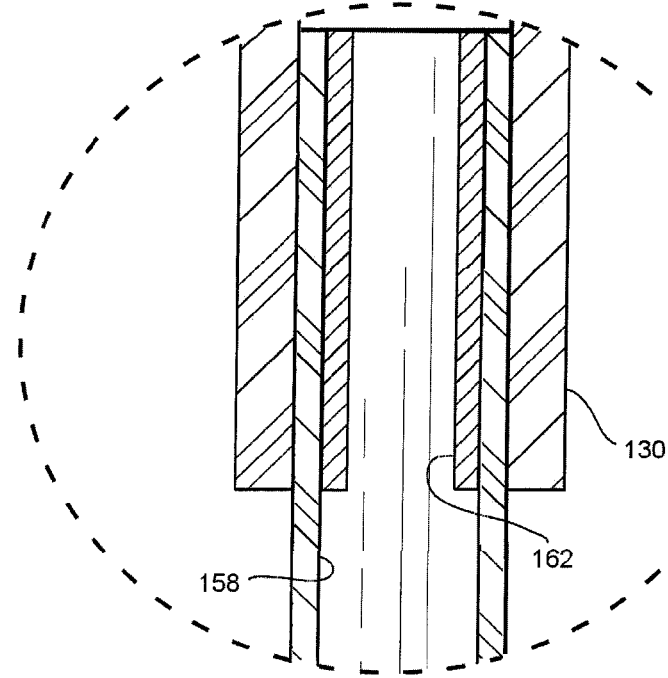
FIG. 8b is an exploded view of one of the molded tube areas of FIG. 8 with insert.

Water reservoir 100 is made by initially extruding an initial profile, preferably essentially cylindrical as illustrated in FIGS. 7-8b As the profile is extruded, it can either be cut to a predetermined length, and transitioned into a heating oven, or transferred immediately into a mold. In order to manufacture the serpentine profile illustrated in the figures, the mold will need to have a corresponding serpentine configuration. The mold internal dimensions are of similar diameter to that of the extrudate profile for the U-shaped bend regions, and preferably are slightly larger. The diameter of the middle section of the mold will be larger than that of the extudate. In the process embodiment where the extrudate is transitioned immediately into the mold, an operator manually shapes the extrudate to follow the serpentine path of the mold. After positioning of the extrudate, the operator inserts at least a portion of inlet profile 158 and outlet profile 160 into the beginning and end apertures of the extrudate profile. The depth of the insertion defines the sealing region of the exterior surface of the inserted profile with the interior surface of the extrudate. The operator seals one profile end and connects the other profile end to a source of pressure, typically compressed air. The mold is closed and pressure applied to expand the profile within the mold to conform to the mold cavity dimensions. While the option of sealing one end of the profile is described above, it is envisioned that an operator may choose to connect both profile ends to a source of pressure and expansion of the extrudate is effected from both ends. It is further envisioned that vacuum could be applied to the exterior of the extrudate in the mold to assist in the expansion process of the extrudate or used as the sole means of effecting the extrudate expansion within the mold.

In another embodiment of the invention, namely the process whereby the initial extrudate is transitioned into a heating oven, the extrudate profile is heated or maintained at a temperature at which the profile is malleable, yet will not collapse upon itself. This extrudate profile is transferred into a mold having a cavity of the desired geometry and the process is repeated in a manner similar to that described above.

As illustrated in FIG. 8a and FIG. 8b, depending upon the material composition of the extrudate, and the temperatures involved, it is an optional process variation to have an insert 162 positioned at each end of the inlet profile 158 and outlet profile 160. This insert may be metallic or polymeric and is used to insure that at least a portion of the heated portion of the inserted profile remains open for liquid to flow therein. The need for this insert is known to those skilled in the art depending upon the mold temperatures and/or the extrusion temperature and the interaction therebetween.

By inserting the inlet and outlet tubes into the heated serpentine profile, it is possible to obtain a material-to-material bond therebetween by a judicious choice of the composition of each. There are several means by which this bond may be effected. One of the simplest procedures is to insure that at least a component of the inlet and outlet profiles and that of the reservoir main body polymer profile is the same. Alternatively, it would be possible to insure that at least a portion of the polymer composition of the inlet and outlet profiles and that of the reservoir main body polymer profile is sufficiently similar or compatible so as to permit the melt fusion or blending or alloying to occur at least in the interfacial region between the exterior surfaces of the inserted profiles and the contacting interior region of the extrudate main body polymer profile. Another manner in which to state this would be to indicate that at least a portion of the polymer compositions of the inserted profiles and main body are miscible.

While the precise composition of the inserted profiles and main body profile polymer are not required to be of any specified composition, in general, there are several guidelines which are applicable in the practice of this invention. It is of course, recognized that the precise operating conditions utilized in the sealing process are well-known in the art and are specific to each polymer combination. It is well within the skill of the art to determine the applicable conditions which will result in the appropriate degree of bonding required for the intended end-use application, which is dependent upon the required pressure that the final water reservoir will be subject to. Shorter cycle times will be achieved with higher mold temperatures and vice-versa. Similar considerations will be applicable dependent upon the thickness of the parts to be sealed together. The inserted plastic profiles can be a thermoplastic or a thermoset The key is that the overlapping regions of the main extrudate profile with that of the inserted profile must be capable of forming a leak-proof bond, either chemical or physical.

The above conditions may be met by using polymer compositions which have differing softening points or may involve the use of two compositions which have the same softening point, but which are of different thickness. Through manipulation of the time, temperature and pressure conditions experienced during the compression molding operation, the inserted profile will not experience melt flow, even though it had a similar softening point or range. It is also possible that through the incorporation of various additives in the polymeric compositions, e.g., glass fibers, heat stabilizers, antioxidants, plasticizers, etc., the softening temperatures of the polymers may be controlled.

In a preferred embodiment of the invention, the composition of the main body of the water reservoir extrudate polymer will be such that it will be capable of at least some melt fusion with the composition of the inserted plastic profile, thereby maximizing the leak-proof characteristics of the interface between the exterior of the inserted profile and the interior of the main body extrudate. There are several means by which this may be effected. One of the simplest procedures is to insure that at least a component of the plastic conduit and that of the overmolded polymer is the same. Alternatively, it would be possible to insure that at least a portion of the polymer composition of the plastic conduit and that of the overmolded polymer is sufficiently similar or compatible so as to permit the melt fusion or blending or alloying to occur at least in the interfacial region between the exterior of the plastic conduit and the interior region of the overmolded polymer. Another manner in which to state this would be to indicate that at least a portion of the polymer compositions of the plastic conduit and the overmolded polymer are miscible.

Depending on the equipment available, the end application requirements, cost factors, etc., the starting extrudate material will be different. For many applications, polyolefins, e.g., polypropylene, polyethylene, etc., are preferred. Depending on the application, the polyethylene may be crosslinked, or partially crosslinked. The crosslinking of the polyethylene may be effected in two stages, with an initial degree of crosslinking being less than 50%, preferably less than 35%, followed by post-extrusion processing, and ultimately a second degree of crosslinking raising the final degree of crosslinking to at least 60% or higher, often to 85%. Cost usually decides which crosslinking method needs to be used to provide a given quality of tubing. The benefit of crosslinking the polyethylene subsequent to the fabrication steps described in the application is that a chemical and/or thermal material bond is formed during the compression molding processes, resulting in a stronger product. However, there may be applications where this high degree of bonding is not essential, thereby permitting the use of previously crosslinked material during the fabrication procedure. Previously crosslinked material has a much better hot melt strength since the crosslinking gives it more structure, and making forming easier. However, the crosslinked material will not chemically bond to itself even when heated to the clear state. The material in the formed ends is not completely sealed upon itself, but molded in place with pressure.

Crosslinking can of course, be accomplished in many different ways. Crosslinking can be performed during the extrusion process, e.g., by Engel process, or post-extrusion, e.g., by a silane process or a peroxide process or combinations thereof wherein some crosslinking occurs during the extrusion step and is completed in a hot bath post-extrusion step. Each process has a crosslinking catalyst that causes the polymer to crosslink when certain temperature and pressure are used. One additional way to crosslink is to use radiation. In this method, extruded tubes are passed under a radiation unit and the exposure causes crosslinking. It usually is more economical to radiate straight tubes since the economics revolve around how many parts will fit on a cart that rolls under the beam. However, this does not represent the only embodiment contemplated within the invention. It is envisioned that under some circumstances, it would be appropriate to crosslink the final product. Crosslinking of plastics, particularly polyolefins, most preferably polyethylene is desirable in that it removes any odor and/or taste-imparting additives which may be leached from the plastic when in contact with water.

Therefore, what has been described above may be generalized as the ability to fabricate a plastic part by the combination of several processing technologies in sequence, namely extrusion followed by a combination of compression molding and air-core molding, the latter two methodologies being employed either essentially simultaneously or sequentially. Plastic profiles are extruded with subsequent insertion into a mold having a cavity of desired internal configuration. The heated and/or malleable extrudate is positioned in the mold followed by insertion of previously extruded profiles which are inserted into the beginning and end apertures of the main extrudate body. One end of an inserted profile is sealed while the remaining open end of the other inserted profile is connected to a pressurized source of gas. The mold is closed and pressure applied to expand the main extrudate body to fill the mold cavity. Through the application of heat and pressure about the sealing regions of the inserted profiles for an appropriate amount of time depending upon the thickness, composition and either latent heat of the main extrudate or applied heat in the mold, an essentially leak-proof seal is effected. The pressure is released and reservoir assembly removed from the mold.

Therefore, what has been described above is a process for making a reservoir comprising the steps of: positioning a hollow extrudate at a first temperature (essentially at the extrusion temperature of the extrudate or slightly below) having a profile into a mold with a cavity, the mold cavity having at least one cavity dimension which is larger than a corresponding dimension of the extrudate profile; the extrudate having a first and second opening, each opening positioned at an end of the extrudate; inserting one end of a hollow first polymeric profile at a second temperature (often approximately room temperature), the second temperature being less than the first temperature into the first opening of the extrudate, the end of the first profile being dimensionally smaller than the first opening of the extrudate; inserting one end of a hollow second polymeric profile at a third temperature (and often approximately room temperature), the third temperature being less than the first temperature into the second opening of the extrudate, the end of the second profile being dimensionally smaller than the second opening of said extrudate; sealing or affixing at least one source of pressurized gas to at least one non-inserted end of either the first or second profile; closing the mold and pressurizing said hollow extrudate by the application of pressure through at least one non-inserted end so that the hollow extrudate expands to fill said at least one cavity dimension through the application of internal pressure or external vacuum and form forming at least one expanded section in the extrudate and compressively seal an exterior surface of the two inserted ends of the first and second hollow profiles with an interior surface of said ends of the extrudate using the latent heat within the extrudate at the first temperature and forming a reservoir; releasing the pressure and/or vacuum; and removing the reservoir from said mold.

It should be recognized that while the positioning of the water reservoir has been illustrated to be essentially vertical in placement within the refrigeration unit, there is no need to limit the reservoir to this orientation. It is envisioned to be within the scope of this invention that any and all orientations which fit within the appropriate location of the unit are within this invention. Reservoir orientation plays no role in this invention. It is also envisioned that the reservoir described hereinabove could be used for applications other than the transport of liquids, namely gaseous transport. When used for gases, filter material may optionally be included, e.g., molecular sieves, diatomaceous earth, etc.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the invention is by way of example, and the scope of the invention is not limited to the exact details shown or described. This invention has been described in detail with reference to specific embodiments thereof, including the respective best modes for carrying out each embodiment. It shall be understood that these illustrations are by way of example and not by way of limitation.

What is claimed is:

1. A process for making a reservoir comprising the steps of:
   (a) positioning a pliable hollow extrudate into a mold with a serpentine cavity at a first temperature, said extrudate having a profile in cross-section,
      (i) said serpentine cavity having at least one cavity dimension which is larger than a corresponding dimension of said extrudate profile, said serpentine cavity having at least two essentially parallel expanded middle sections and at least a pair of oppositely necked regions, each necked region interconnected by generally U-shaped bends;
      (ii) said extrudate having a first and second opening, each opening positioned at an end of said extrudate;
   (b) inserting one end of a hollow first polymeric profile at a second temperature, said second temperature being less than said first temperature, into said first opening of said extrudate, said end of said first profile being dimensionally smaller than said first opening of said extrudate;
   (c) inserting one end of a hollow second polymeric profile at a third temperature, said third temperature being less than said first temperature, into said second opening of said extrudate, said end of said second profile being dimensionally smaller than said second opening of said extrudate;
   (d) sealing one non-inserted end in combination with affixing at least one source of pressurized gas to said other non-inserted end of either said first or second profile;
   (e) closing said mold and pressurizing said hollow extrudate by the application of pressure through said other non-inserted end having at least one source of pressurized gas affixed thereto so that said hollow extrudate expands to fill said at least one cavity dimension, to form at least one expanded section in said extrudate, and to compressively seal an exterior surface of said two inserted ends of said first and second hollow profiles with an interior surface of said ends of said extrudate using said latent heat within said extrudate at said first temperature and forming a reservoir, wherein said reservoir includes said first and second polymeric profiles;

(f) releasing said pressure; and (g) removing said reservoir from said mold.

2. The process of claim 1 wherein
said latent heat from said extrudate is sufficient to permit positioning of said hollow extrudate profile into said mold without the application of external heat.

3. The process of claim 1 which further comprises
a step of crosslinking said extrudate.

4. The process of claim 3 wherein
said extrudate and said first and second profiles are polyolefins.

5. The process of claim 4 wherein
said polyolefin is polyethylene.

6. The process of claim 3 wherein
said step of crosslinking is effected by exposure to an electron beam.

7. The process of claim 1 wherein
said hollow extrudate is at least partially crosslinked before insertion of said first and second profiles.

8. A process for making a reservoir comprising the steps of:
(a) positioning a pliable hollow cylindrical extrudate into a mold with a serpentine cavity at a first temperature, said extrudate having a profile in cross-section,
   (i) said serpentine cavity having at least one cavity dimension which is larger than a corresponding dimension of said extrudate profile, said serpentine cavity having at least two essentially parallel expanded middle sections and at least a pair of oppositely necked regions, each necked region interconnected by generally U-shaped bends;
   (ii) said extrudate having a first and second opening, each opening positioned at an end of said extrudate;
(b) inserting one end of a hollow first cylindrical polymeric profile at a second temperature, said second temperature being less than said first temperature, into said first opening of said extrudate, said end of said first profile being dimensionally smaller than said first opening of said extrudate;
(c) inserting one end of a hollow second cylindrical polymeric profile at a third temperature, said third temperature being less than said first temperature, into said second opening of said extrudate, said end of said second profile being dimensionally smaller than said second opening of said extrudate;
(d) affixing at least one source of pressurized gas to each non-inserted end of said first and second profile;
(e) closing said mold and pressurizing said hollow extrudate by the application of pressure through at least one end so that said hollow extrudate expands to fill said at least one cavity dimension, forming at least one expanded section in said extrudate, and compressively sealing an exterior surface of said two inserted ends of said first and second hollow profiles with an interior surface of said ends of said extrudate using said latent heat within said extrudate at said first temperature, thereby forming a reservoir, wherein said reservoir includes said first and second polymeric profiles;
(f) releasing said pressure; and
(g) removing said reservoir from said mold.

9. The process of claim 8 wherein
said latent heat from said extrudate is sufficient to permit positioning of said hollow extrudate profile into said mold without the application of external heat.

10. The process of claim 8 which further comprises a step of crosslinking said extrudate.

11. The process of claim 10 wherein
said extrudate and said first and second profiles are polyolefins.

12. The process of claim 11 wherein
said polyolefin is polyethylene.

13. The process of claim 10 wherein said step of crosslinking is effected by exposure to an electron beam.

14. The process of claim 8 wherein
said hollow extrudate is at least partially crosslinked before insertion of said first and second profiles.

15. The process of claim 8 which further comprises
the step of adding an insert into at least one of said first and second profiles.

16. A process for making a water reservoir comprising the steps of:
(a) extruding a hollow polymeric profile at an extrusion temperature;
(b) transferring said extrudate into a serpentine mold with a cavity at a temperature where said extrudate is formable,
   (i) said serpentine cavity having at least one cavity dimension which is larger than a corresponding dimension of said extrudate profile, said serpentine cavity having at least two essentially parallel expanded middle sections and at least a pair of oppositely necked regions, each necked region interconnected by generally U-shaped bends;
   (ii) said extrudate having a first and second opening, each opening positioned at an end of said extrudate;
(c) compressively sealing two hollow polymeric profiles essentially at room temperature in said openings of said extrudate at opposed ends of said extrudate using latent heat of said extrudate;
(d) expanding at least one portion of said extrudate by the application of a means for expanding to said extrudate;
(e) releasing said means for expanding; and
(f) removing said reservoir, including said first and second polymeric profiles, from said mold.

17. The process of claim 16 wherein
said latent heat from said extrudate is sufficient to permit positioning of said hollow extrudate profile into said mold without the application of external heat.

18. The process of claim 17 which further comprises a step of crosslinking said extrudate.

19. The process of claim 18 wherein said extrudate and said first and second profiles are polyolefins.

20. The process of claim 19 wherein
said polyolefin is polyethylene.

21. The process of claim 18 wherein
said step of crosslinking is effected by exposure to an electron beam.

22. The process of claim 16 wherein
said hollow extrudate is at least partially crosslinked before insertion of said first and second profiles.

23. The process of claim 16 which further comprises
the step of adding an insert into at least one of said polymeric profiles.

24. The process of claim 16 wherein
said means for expanding is internal pressure.

25. The process of claim 16 wherein
said means for expanding is external vacuum.

26. The process of claim 16 wherein
said means for expanding is internal pressure and external vacuum.

* * * * *